W. G. WHITTLESEY.
COOLING DEVICE.
APPLICATION FILED FEB. 21, 1911.
997,430.
Patented July 11, 1911.
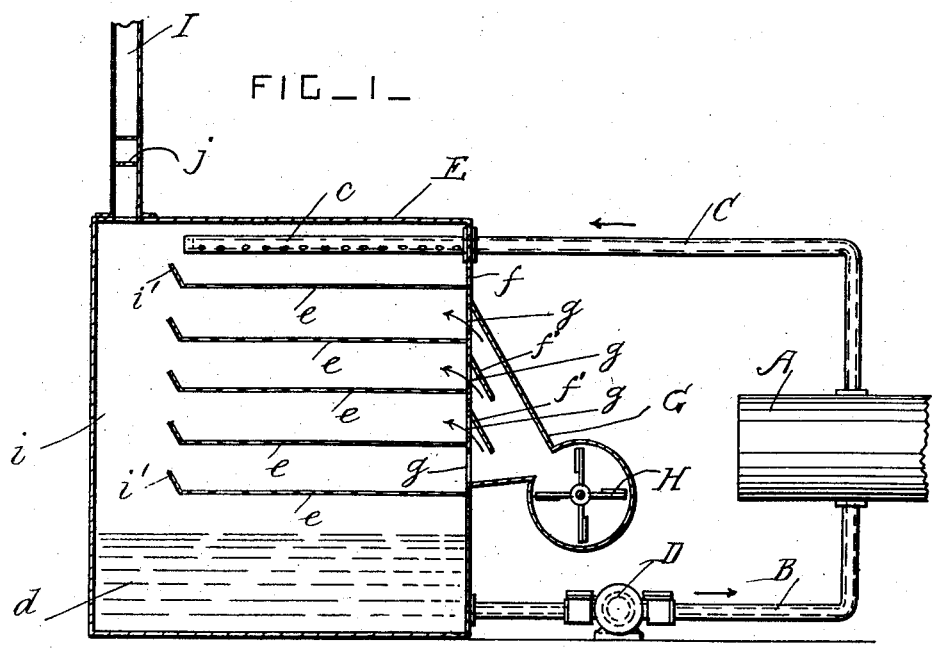
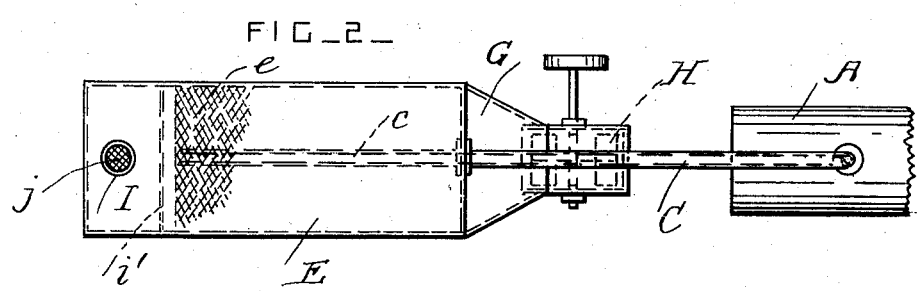
Witnesses
Inventor
Watson G. Whittlesey,
By Herbert W. Jenner.
Attorney

UNITED STATES PATENT OFFICE.

WATSON G. WHITTLESEY, OF GILMORE CITY, IOWA.

COOLING DEVICE.

997,430.  Specification of Letters Patent.  Patented July 11, 1911.

Application filed February 21, 1911. Serial No. 610,098.

*To all whom it may concern:*

Be it known that I, WATSON G. WHITTLESEY, a citizen of the United States, residing at Gilmore City, in the county of Pocahontas and State of Iowa, have invented certain new and useful Improvements in Cooling Devices; and I do hereby declare the following to be a full, clear, and exact description of the invention, such as will enable others skilled in the art to which it appertains to make and use the same.

This invention relates to cooling apparatus for use in connection with gas-engine traction-engines; and it consists in the novel construction and combination of the parts hereinafter fully described and claimed.

In the drawings, Figure 1 is a vertical section through a cooling apparatus constructed according to this invention. Fig. 2 is a plan view of the same.

A is a portion of the water cooling-jacket around the cylinder of a gas engine such as is used to drive a traction-engine.

B is the cool water inlet-pipe connected to the lower side of the packet, and C is the hot water outlet-pipe connected to its top.

D is a circulating pump of any approved construction included in the pipe B, and driven from the engine or in any other approved manner.

E is the cooling chamber preferably formed of thin sheet metal, and provided with a series of drip pans or trays e arranged one above the other. These drip pans or trays are formed of wire gauze or perforated metal so as to form sieves. These pans are secured at one end to one end wall f of the chamber, and g are air inlet openings in the wall f between the pans. These inlet openings are provided with deflecting plates f' which project outwardly and downwardly.

G is a hood which is secured over all the inlet openings g, and which has a fan or blower H of any approved construction secured to its smaller end. This fan is driven from the engine, or in any other approved manner.

At the top of the chamber E, and at the other end thereof from the air inlet openings, an outlet pipe I for steam and hot air is provided. A vertical passage i is formed in the chamber under the outlet pipe I, and between the ends i' of the pans and the adjacent end wall of the chamber, to permit the steam and hot air to pass from between the pans to the outlet pipe. The outlet pipe is preferably provided with screens or strainers j to prevent water from being blown up it in the form of spray.

The cool water pipe B is connected to the water space d in the lower part of the chamber E. The hot water pipe C is secured to the upper part of the chamber E, and is provided with a perforated extension pipe c arranged over the top pan of the series.

The fan is revolved continuously, and it drives cool air through the chamber E, between and over the said drip pans, in the direction of the arrows. The hot water is broken up into small drops or streams by the perforated pipe and the drip pans, and it is cooled by contact with the air currents passing through the cooling chamber. In this manner the cylinder jacket is constantly supplied with cool water, and the gas engine can be run satisfactorily in the hottest and stillest weather.

What I claim is:

In cooling devices, the combination, with a closed cooling chamber, of a series of superposed drip-pans, one end of each pan being secured to one end wall of the chamber and the other end of each pan being provided with an upwardly projecting flange, a vertical passage being provided in the chamber between its other end wall and the flanges on the pans, said chamber having also inlet openings for air in its first said end wall between the pans, an outlet pipe for steam and air secured to the top of the chamber over the vertical passage, a fan, a hood connected to the fan and inclosing all the air inlet openings, air deflecting plates arranged in the hood between the air inlet openings, and circulating pipes for liquid connected to the upper and lower parts of the said chamber.

In testimony whereof I have affixed my signature in the presence of two witnesses.

WATSON G. WHITTLESEY.

Witnesses:
J. L. DEW,
C. S. KENNEDY.